(12) United States Patent
Takada et al.

(10) Patent No.: US 10,348,490 B2
(45) Date of Patent: Jul. 9, 2019

(54) INFORMATION PROCESSING DEVICE, AUTHORIZATION SYSTEM, INFORMATION PROCESSING METHOD, AND RECORDING MEDIUM

(71) Applicant: NS SOLUTIONS CORPORATION, Tokyo (JP)

(72) Inventors: Masaaki Takada, Tokyo (JP); Hiroshi Furukawa, Tokyo (JP); Hideki Kohno, Tokyo (JP); Ryuichiro Kai, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 237 days.

(21) Appl. No.: 15/373,251

(22) Filed: Dec. 8, 2016

(65) Prior Publication Data
US 2017/0171212 A1   Jun. 15, 2017

(30) Foreign Application Priority Data

Dec. 10, 2015   (JP) ................................. 2015-241429
Nov. 1, 2016    (JP) ................................. 2016-214604

(51) Int. Cl.
*H04L 9/08*    (2006.01)
*H04L 29/06*   (2006.01)
(Continued)

(52) U.S. Cl.
CPC ............. *H04L 9/085* (2013.01); *G06F 21/41* (2013.01); *G06F 21/6218* (2013.01); *H04L 63/0815* (2013.01); *H04L 63/102* (2013.01)

(58) Field of Classification Search
CPC ....................................................... H04L 9/085
(Continued)

(56) References Cited

U.S. PATENT DOCUMENTS 8,549,007 B1 *  10/2013  Wormley ................ G06F 16/13
                                                            707/741
9,430,655 B1 *  8/2016   Stockton ............... G06F 21/602
(Continued)

FOREIGN PATENT DOCUMENTS

JP    2005-209118 A    8/2005
JP    4860779 B1       1/2012
(Continued)

OTHER PUBLICATIONS

Japanese Office Action of related Japanese Applicaton No. 2016-214604, dated Feb. 26, 2019.

*Primary Examiner* — Dant B Shaifer Harriman
(74) *Attorney, Agent, or Firm* — Arent Fox LLP

(57) ABSTRACT

An information processing device includes: a first acquisition unit that acquires authorization omission information being information indicating how many save units among a plurality of save units in which object pieces of an object divided into a division number are stored respectively do not need authorization processing, based on the division number indicating how many object pieces the object is to be divided into and a restoration number being a number of object pieces required to restore the object; and a decision unit that decides a save unit which does not need the authorization processing from among the plurality of save units, based on the authorization omission information acquired by the first acquisition unit.

14 Claims, 11 Drawing Sheets

| DATA CENTER | AUTHORIZATION PROCESSING |
|---|---|
| DC1 | NECESSARY |
| DC2 | NECESSARY |
| DC3 | NECESSARY |
| DC4 | UNNECESSARY |

(51) Int. Cl.
*G06F 21/41* (2013.01)
*G06F 21/62* (2013.01)

(58) Field of Classification Search
USPC .............................................................. 726/4
See application file for complete search history.

(56) References Cited

U.S. PATENT DOCUMENTS

| | | | |
|---|---|---|---|
| 10,091,000 B2* | 10/2018 | Smith | H04L 9/085 |
| 2006/0072744 A1* | 4/2006 | Ogihara | H04L 9/085 |
| | | | 380/28 |
| 2008/0005800 A1* | 1/2008 | Yokota | G06F 21/62 |
| | | | 726/26 |
| 2011/0126295 A1* | 5/2011 | Resch | G06F 21/64 |
| | | | 726/27 |
| 2014/0181935 A1* | 6/2014 | Beckmann | H04L 63/10 |
| | | | 726/7 |
| 2015/0121020 A1* | 4/2015 | Bita | G06F 3/0613 |
| | | | 711/158 |
| 2016/0337119 A1* | 11/2016 | Hosaka | H04L 9/32 |

FOREIGN PATENT DOCUMENTS

| | | | |
|---|---|---|---|
| JP | 2013-020313 A | 1/2013 | |
| JP | 2013-120515 A | 6/2013 | |

* cited by examiner

FIG.6

| DATA CENTER | AUTHORIZATION PROCESSING |
|---|---|
| DC1 | NECESSARY |
| DC2 | NECESSARY |
| DC3 | NECESSARY |
| DC4 | UNNECESSARY |

INFORMATION PROCESSING DEVICE, AUTHORIZATION SYSTEM, INFORMATION PROCESSING METHOD, AND RECORDING MEDIUM

CROSS-REFERENCE TO RELATED APPLICATIONS

This application is based upon and claims the benefit of priority of the prior Japanese Patent Application No. 2015-241429, filed on Dec. 10, 2015, and the Japanese Patent Application No. 2016-214604, filed on Nov. 1, 2016, the entire contents of which are incorporated herein by reference.

BACKGROUND OF THE INVENTION

[Field of the Invention]

The present invention relates to an information processing device, an authorization system, an information processing method, and a recording medium.

[Description of the Related Art]

In a system handling important electronic data such as individual information or the like, the risk of information leak due to decryption or leak of an encryption key cannot be sufficiently reduced even if data is encrypted. As a technique for solving the above problem, a secret sharing scheme is known. The secret sharing scheme is a technique of dividing important data into a plurality of data pieces not directly connected to the original data, and has such a characteristic that even if a third person acquires some of the data pieces, the third person cannot restore the important data.

Patent Document 1 and Patent Document 2 disclose data distribution and save systems in which a plurality of data pieces are generated from important data using the secret sharing scheme and distributed and saved in servers on a plurality of data centers (hereinafter, referred to as DCs).

[Patent Document 1] Japanese Laid-open Patent Publication No. 2013-120515

[Patent Document 2] Japanese Patent No. 4860779

In an object management system which divides an object into a plurality of object pieces and distributes and saves the object pieces in save servers included in the plurality of DCs, a user usually needs to individually perform user authentication for each of the DCs or the like. In this case, a single sign-on technology is often used to prevent complication of authentication processing. Patent Document 2 discloses a single sign-on technology of holding password information different for the server of each of the DCs and individually performs authentication processing.

However, since the password information is held in each server, update processing is generated also in each server when the information is updated. Further, operation and maintenance of each server becomes complicated. There is a conceivable method that transfers information on an authentication result and an authorization result performed in specific servers such as authentication and authorization servers or the like by performing communication between the servers, but has a problem of requiring much time for communication processing when the communication speed between DCs is low.

SUMMARY OF THE INVENTION

Hence, an object of the present invention is to prevent increase in communication time required for operation of an object.

Hence, an information processing device of the present invention includes: a first acquisition unit that acquires authorization omission information being information indicating how many save units among a plurality of save units in which object pieces of an object divided into a division number are stored respectively do not need authorization processing, based on the division number indicating how many object pieces the object is to be divided into and a restoration number being a number of object pieces required to restore the object; and a decision unit that decides at least one save unit which does not need the authorization processing from among the plurality of save units, based on the authorization omission information acquired by the first acquisition unit.

BRIEF DESCRIPTION OF THE DRAWINGS

FIG. 6 is a chart illustrating an example of information utilized for management of necessity of the authorization request;

DETAILED DESCRIPTION OF THE PREFERRED EMBODIMENTS

Hereinafter, embodiments of the present invention will be described based on the drawings.

<Embodiment 1>

Figure 1:
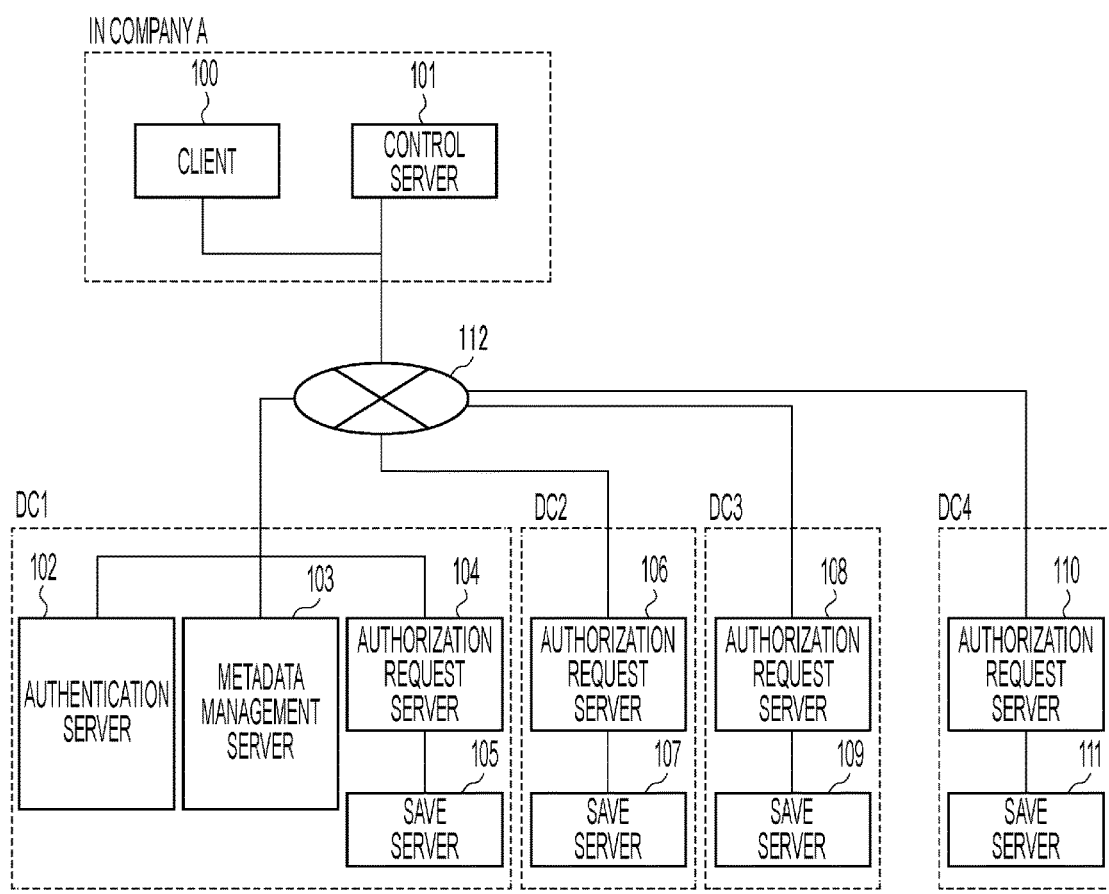
FIG. 1 is a diagram illustrating an example of a system configuration of an object management system.

FIG. 1 is a diagram illustrating an example of a system configuration of an object management system. The object management system in this embodiment is a system used by users in a company A. The object management system includes a client PC 100, a control server 101, an authentication server 102, a metadata management server 103, authorization request servers 104, 106, 108, 110, and save servers 105, 107, 109, 111. The object management system is an example of the an authorization system.

The client PC 100 and the control server 101 are installed in the company A. The client PC 100 and the control server 101 can communicate with each other over a network in the company A without over a network 112. The client PC 100 is a computer or the like. The control server 101 is an example of a control device. Examples of the control device include a PC having a functional configuration described later with FIG. 3B and the like.

The authentication server 102, the metadata management server 103, the authorization request server 104, and the save server 105 are installed in a DC1. The authentication server 102, the metadata management server 103, and the authorization request server 104 can communicate with one another over a network in the DC1 without over the network 112.

The authorization request server 106 and the save server 107 are installed in a DC2. The authorization request server 108 and the save server 109 are installed in a DC3. The authorization request server 110 and the save server 111 are installed in a DC4. The authorization request server and the save server installed in the same DC can communicate with each other over a network in each DC without over the network 112.

The client PC 100, the control server 101, the authentication server 102, the metadata management server 103, the authorization request servers 104, 106, 108, 110 are connected with one another over the network 112. The network 112 is the Internet, a LAN, a WAN or the like. The save servers 105, 107, 109, 111 are connected to the authorization request servers 104, 106, 108, 110 respectively but not directly connected to the network 112.

In this embodiment, the number of DCs included in the object management system is four but may be three or five or more. Besides, in this embodiment, each DC includes one authorization request server, but may include two or more authorization request servers. Further each DC includes one save server connected to the authorization request server but may include two or more save servers.

The client PC 100 makes an authorization request to the authentication server 102, and makes an operation request of an object such as a save request, an acquisition request or the like of the object to the control server 101. The object being an operation request target is an electronic file, data or the like. The operation request of the object is a save request, an acquisition request or the like of the object.

The control server 101 performs division/restoration processing of the object, inquires of the metadata management server 103 about a save destination/acquisition source of the object, and makes a save request/acquisition request of the object to each save server.

In this embodiment, the client PC and the control server 101 are separate system components, but a single control device including functions of both of them may perform processing of the client PC and the control server 101.

The authentication server 102 receives authentication information from the client PC 100 and checks the identity of a login user. The authentication server 102 further receives a role and a session from the metadata management server 103, and confirms the validity of the role of the user. The authentication processing is processing for confirming the identity of the user.

The metadata management server 103 returns information indicating a save destination to the save destination inquiry from the control server 101, and receives an authorization request from each authorization request server and performs authorization processing. The authorization processing is processing of confirming whether the user has the authority to make an operation request of the object.

In this embodiment, the authentication server 102 and the metadata management server 103 are constituted as separate devices, but a single device can be made to perform the processing of the authentication server 102 and the metadata management server 103. However, if the single device performs the metadata management and the authentication and authorization, when the device is taken over by a baleful user, it is grasped that what data is in which save server, and authentication and authorization is also made, possibly deteriorating the security. Therefore, the device that performs metadata management and authorization processing and the device that performs authentication processing are separate devices and configured so that different administers can manage them. For the same reason, a part of the DCs may be configured to be managed by different business operators from those of the other DCs.

The authorization request server 104, 106, 108, 110 makes a request for authorization processing regarding an operation request to a corresponding save server, to the metadata management server 103.

The save server 105, 107, 109, 111 saves, reads and the like data such as an object piece of an object or the like.

The control server 101 transmits the operation request of the object not directly to the save server but to the authorization request server connected to the save server. When receiving the operation request from the control server 101, the authorization request server requests the metadata management server 103 to perform authorization processing for confirming whether the operation request has been made by the user having the appropriate authority. When the operation request is authorized by the metadata management server 103, the authorization request server transmits the operation request of the object to the save server connected thereto.

In this embodiment, the authorization request server and the save server are separate devices. However, a single device may perform the processing of the authorization request server and the save server.

Figure 2:
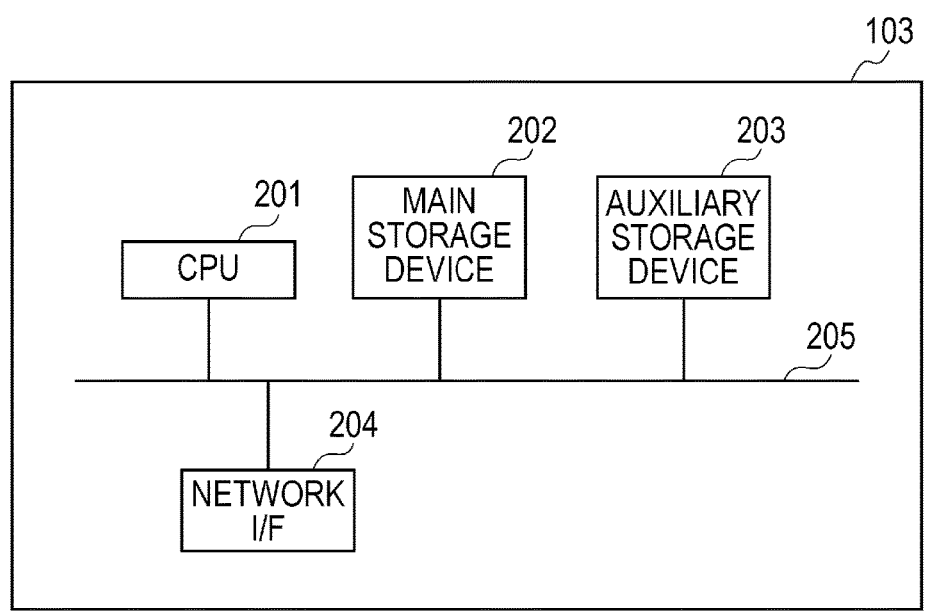
FIG. 2 is a diagram illustrating an example of a hardware configuration of a metadata management server.

FIG. 2 is a diagram illustrating an example of a hardware configuration of the metadata management server 103.

The metadata management server 103 includes a CPU 201, a main storage device 202, an auxiliary storage device 203, and a network I/F 204. The CPU 201, the main storage device 202, the auxiliary storage device 203, and the network I/F 204 are connected to one another via a system bus 205.

The CPU 201 is a central processing unit that controls the processing in the metadata management server 103. The CPU 201 executes a program of an application program OS, a control program and so on stored in the auxiliary storage device 203 or the like.

The main storage device 202 is a storage device that functions as a main memory, a work area and so on of the CPU 201. Data such as variables and the like used when the CPU 201 executes the processing based on the program is stored in the main storage device 202.

The auxiliary storage device 203 stores the program of the application program OS, the control program, various kinds of setting data and so on.

The network I/F 204 is an interface used when the metadata management server 103 performs communication with external devices.

The CPU 201 executes the processing, based on the programs stored in the auxiliary storage device 203 or the like, thereby realizing later-described functions of the metadata management server 103 and later-described processing in flowcharts.

Hardware configurations of the client PC 100, the control server 101, the authentication server 102, the authorization request server 104, and the save server 105 are the same as that of the metadata management server 103.

The CPU of the client PC 100 executes the processing, based on the programs stored in the auxiliary storage device or the like of the client PC 100, thereby realizing later-described functions of the client PC 100 and later-described processing in the flowcharts.

The CPU of the control server 101 executes the processing, based on the programs stored in the auxiliary storage device or the like of the control server 101, thereby realizing later-described functions of the control server 101 and later-described processing in the flowcharts.

The CPU of the authentication server 102 executes the processing, based on the programs stored in the auxiliary storage device or the like of the authentication server 102, thereby realizing later-described functions of the authentication server 102 and later-described processing in the flowcharts.

The CPU of the authorization request server 104 executes the processing, based on the programs stored in the auxiliary storage device or the like of the authorization request server 104, thereby realizing a later-described function of the authorization request server 104 and later-described processing in the flowcharts.

Hardware configurations of the authorization request servers 106, 108, 110 are the same as that of the authorization request server 104.

The CPU of the save server 105 executes the processing, based on the programs stored in the auxiliary storage device or the like of the save server 105, thereby realizing a later-described function of the save server 105 and later-described processing in the flowcharts.

Hardware configurations of the save servers 107, 109, 111 are the same as that of the save serve 105.

Figure 3A:
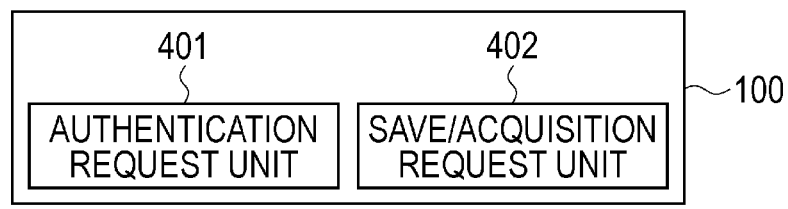
FIG. 3A is a diagram illustrating an example of a functional configuration of a client PC.

FIG. 3A is a diagram illustrating an example of a functional configuration of the client PC 100. The client PC 100 includes an authentication request unit 401, and a save/acquisition request unit 402.

The authentication request unit 401 transmits authentication information (a user ID, a password and so on) to the authentication server 102 to thereby make an authentication request of a user, and acquires a session ID (hereinafter, referred to as an SID) from the authentication server 102 when authentication is performed by the authentication server 102.

The save/acquisition request unit 402 makes an operation request of the object to the control server 101.

Figure 3B:
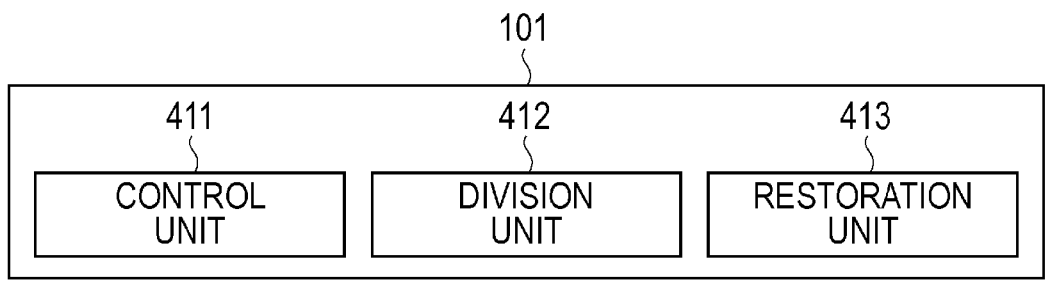
FIG. 3B is a diagram illustrating an example of a functional configuration of a control server.

FIG. 3B is a diagram illustrating an example of a functional configuration of the control server 101. The control server 101 includes a control unit 411, a division unit 412, a restoration unit 413.

The control unit 411 inquires of the metadata management server 103 about a save destination or an acquisition source of the object (each of object pieces made by dividing the object).

The division unit 412 divides the object into a plurality of object pieces when requesting the authorization request servers 104, 106, 108, 110 to save the object.

The restoration unit 413 restores the object from the object pieces of the object acquired from the save servers 105, 107, 109, 111 respectively via the authorization request servers connected to the respective save servers.

Besides, the control unit 411 transmits operation requests of the object pieces to the authorization request servers 104, 106, 108, 110. For example, at the time when saving the object, the control unit 411 transmits save requests of the object pieces including data on the object pieces of the object divided by the division unit 412, to the authorization request servers 104, 106, 108, 110.

Figure 3C:
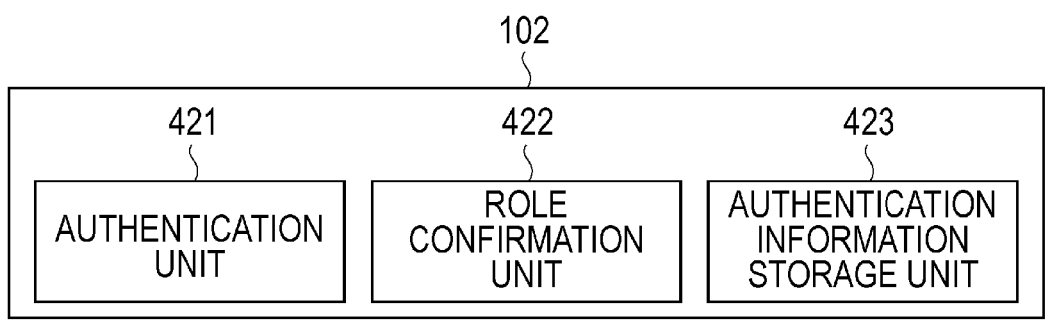
FIG. 3C is a diagram illustrating an example of a functional configuration of an authentication server.

FIG. 3C is a diagram illustrating an example of a functional configuration of the authentication server 102. The authentication server 102 includes an authentication unit 421, a role confirmation unit 422, an authentication information storage unit 423.

The authentication unit 421 receives authentication information from the client PC 100, checks the identity of a login user on the basis of the received authentication information, issues an SID when the identity of the user can be confirmed, and transmits the SID to the client PC 100.

The role confirmation unit 422 receives information indicating the content of the role and information indicating the content of the session from the metadata management server 103, and confirms whether the role of the user is valid based on the received information indicating the content of the role and information indicating the content of the session.

The authentication information storage unit 423 stores and manages the authentication information, role information, session information and so on. In this embodiment, the authentication information is a combination of the user ID and the password. Besides, the role information is a combination of the user ID and the information indicating the content of the role. The information indicating the content of the role may be text information or information of numeric characters such as ID as long as it is information with which the role of a "system administrator", a "general user" or the like can be discriminated. Note that a plurality of users may be allocated to one role, or a user may be in one-to-one correspondence with a role. The session information is a combination of the user ID and the information indicating the content of the session. The information indicating the content of the session is, for example, an ID allocated to each session or the like.

Figure 3D:
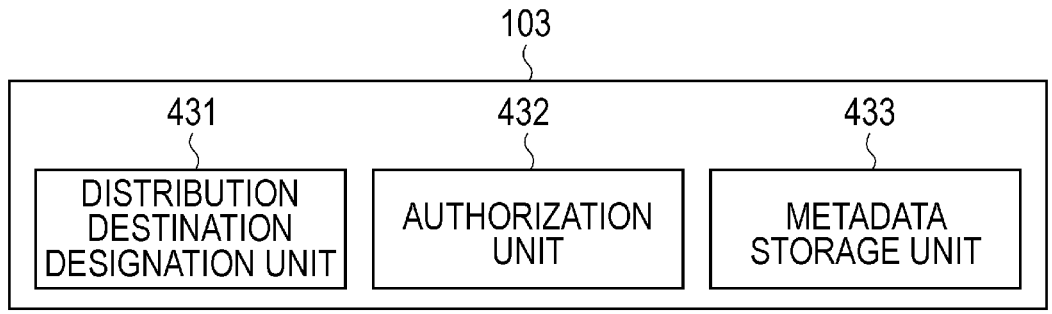
FIG. 3D is a diagram illustrating an example of a functional configuration of the metadata management server.

FIG. 3D is a diagram illustrating an example of a functional configuration of the metadata management server 103. The metadata management server 103 includes a distribution destination designation unit 431, an authorization unit 432, and a metadata storage unit 433.

The distribution destination designation unit 431 receives an inquiry about an operation request destination of the object from the control server 101, confirms whether the role of the user is valid with the authentication server 102, and then transmits specification information of the operation request destination regarding each of the object pieces of the object to the control server 101. When saving the object, the distribution destination designation unit 431 receives the inquiry about a save destination of each of the object pieces of the object from the control server 101, and transmits information on the save destination of each of the object pieces to the control server 101 as a response.

The specification information of the operation request destination is information for specifying the operation request destination and is, for example, a combination of the ID of the object piece of the object, information on the server of the operation request destination, and bus information on a management place of the object piece or the like. The information on the server of the operation request destination is, for example, the ID of the server, the IP address of the server and so on.

The authorization unit 432 receives the authorization request from each authorization request server, and performs authorization processing of the operation request corresponding to the received authorization request. The authorization unit 432 then transmits a result of whether authorization could be made to each authorization request server.

The metadata storage unit 433 stores and manages operation request destination information, authority information and so on. The operation request destination information is various kinds of attribute information regarding the operation request destination and is, for example, a combination of an object name of the operation target, a virtual path of the operation request destination of the object, an ID of the object piece of the object, information indicating a server of the operation request destination regarding the object piece, and information indicating a path of the operation request destination regarding the object piece.

The information indicating the server of the operation request destination regarding the object piece is, for example, an ID, an IP address and so on of the authorization request server or the save server of the operation request destination regarding the object piece. The information indicating the path of the operation request destination regarding the object piece is information on a path indicating the save destination of the object piece of the object in the case of save processing of the object, and is information on a path in which the object piece of the object is saved in the case of acquisition processing of the object.

The authority information is, for example, a combination of a role ID of the user, information on the virtual path of the operation request destination of the object, and information indicating the authority or the like. The virtual path is an operation request destination of a virtual object viewed from the client PC 100. The metadata management server 103 associates the virtual path and an actual path by managing information indicating the correspondence relation between the information on the virtual path and information on the path of the operation request destination of an object piece of an actual object. The information indicating the authority is information indicating whether the role of the user has the authority to make an operation request of the object.

In this embodiment, not the client PC but the metadata management server 103 manages the information on a management place of the object, so that client PCs other than the client PC 100 can also access the managed object.

Figure 3E:
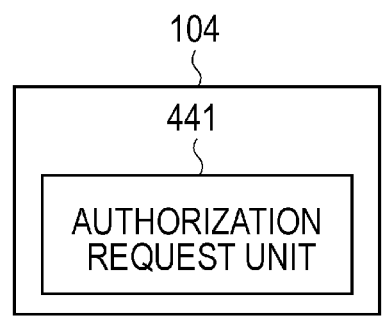
FIG. 3E is a diagram illustrating an example of a functional configuration of an authorization request server.

FIG. 3E is a diagram illustrating an example of a functional configuration of the authorization request server 104. The authorization request server 104 includes an authorization request unit 441. The authorization request unit 441 makes an authorization request to the metadata management server 103. Functional configurations of the authorization request servers 106, 108, 110 are the same as that of the authorization request server 104.

Figure 3F:
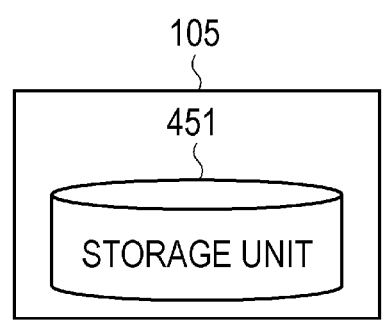
FIG. 3F is a diagram illustrating an example of a functional configuration of a save server.

FIG. 3F is a diagram illustrating an example of a functional configuration of the save server 105. The save server 105 includes a storage unit 451. The storage unit 451 saves and manages the object piece of the object. Functional configurations of the save servers 107, 109, 111 are the same as that of the save server 105.

In this embodiment, the authorization request server and the save server are separate devices. However, a single device including an authorization request unit and a storage unit may perform the processing of the authorization request server and the save server.

In this embodiment, each of the components of the object management system manages information on a number n into which the object is to be divided and a number k (k≤n) of object pieces of the object required to restore the object. Each component stores the information on n, k in the storage device or the like included therein to thereby manage the information on n, k. However, the metadata management server 103, the control server 101 or the like may collectively manage the information on n, k. The number n into which the object is to be divided is an example of a division number. The number k of object pieces of the object required to restore the object is an example of a restoration number.

In this embodiment, the plurality of save servers included in the object management system distribute and manage the object pieces of the object divided into n pieces respectively. The object can be restorable from k (k≤n) or more object pieces. Examples of a method of dividing the object so that the object can be restored from at least k object pieces among the object pieces divided into the n pieces include a threshold secret sharing method and the like.

In this embodiment, each of the plurality of save servers in the object management system manages one object piece of the object. Therefore, in this embodiment, n that is the total number of object pieces and the total number of save servers are equal. Further, in this embodiment, since one DC includes one save server, n and the total number of DCs are an equal value. In other words, one object piece is managed by one DC. However, the number of save servers may be a larger value than n, and the number of DCs may be a value smaller or larger than n.

In this embodiment, for example, in the case of save processing of the object, the control server 101 divides the object into n pieces, and instructs the plurality of authorization request servers included in the object management system to save the object pieces. Besides, in acquiring the object, the control server 101 makes acquisition requests of the object pieces to the authorization request servers connected to the save servers saving the object pieces, and restores the object from the acquired object pieces.

In this embodiment, the object management system omits some authorization processing performed in the DCs while restricting the operation request of the object by a user having no authority. Thus, the object management system can reduce communication performed between the DC requesting the authorization processing and the metadata management server 103 performing the authorization processing to thereby reduce the time required for the processing.

Figure 4:
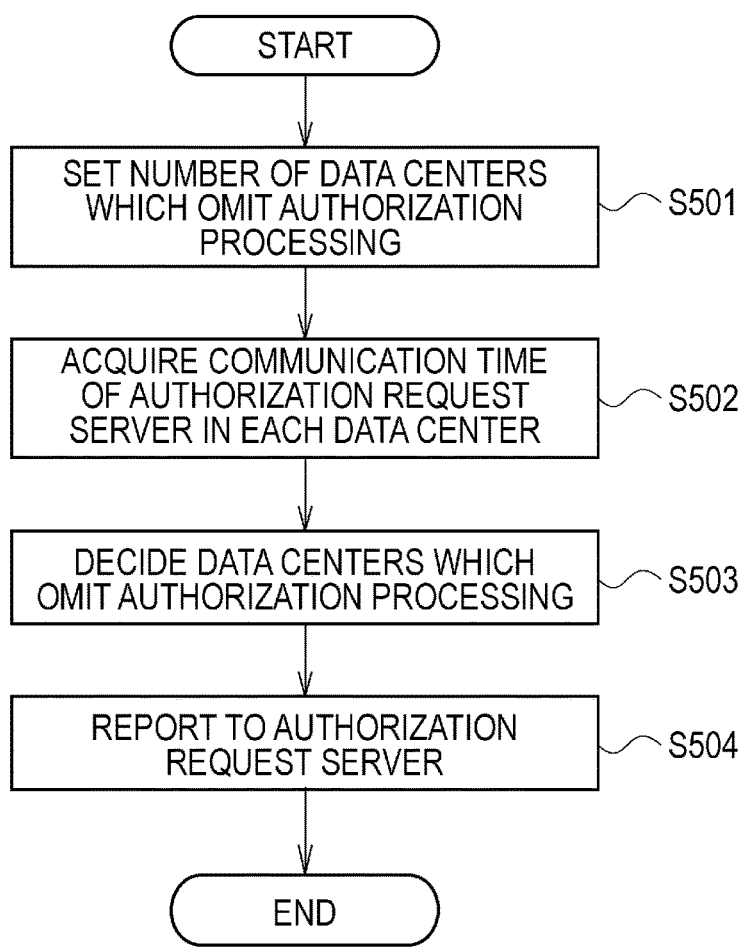
FIG. 4 is a flowchart illustrating an example of decision processing of data center which omit authorization processing.

FIG. 4 is a flowchart illustrating an example of decision processing of data centers which omit the authorization processing. The processing in FIG. 4 is executed by the metadata management server 103. The metadata management server 103 is an example of an information processing device that performs the decision processing of the data centers which omit the authorization processing. In this embodiment, n=4 and k=3, and a DC requiring the longest time for communication with the metadata management server 103 among the DCs 1 to 4 is the DC4.

At S501, the CPU 201 sets the number of DCs which can omit the authorization processing so as to be able to restrict the operation request of the object by the user having no authority, based on the number n indicating how many object pieces the object is to be divided into and the number k of the object pieces required to restore the object. In this embodiment, one authorization request server is included in each DC. Therefore, the DC which can omit the authorization processing includes the authorization request server which can omit the authorization request processing. The number of DCs which can omit the authorization processing and the number of authorization request servers which can omit the authorization request processing are an equal value. The number of authorization request servers which can omit the authorization request processing is an example of an omission number.

The object can be restored when there are k object pieces, so that in order to prevent the user having no authority from acquiring the object, the number of DCs which can omit the authorization processing needs to be equal to or less than k−1. In other words, the number of DCs which need the authorization processing is equal to or more than n−(k−1) =n−k+1.

Besides, assuming that the user having no authority can overwrite k object pieces of the object saved in the save servers, the original object is possibly lost by the operation of the user having no authority. For this reason, the object management system needs to perform the authorization processing in k or more DCs. In other words, the number of DCs which can omit the authorization processing is equal to or less than n−k.

Thus, the CPU 201 sets the number of DCs which perform the authorization processing to a value equal to or more than max(n−k+1, k), and sets a value obtained by subtracting the set value from n as the number of DCs which omit the authorization processing. Therefore, the set number of DCs which omit the authorization processing is a value equal to or less than min(k−1, n−k). In other words, the set number of DCs which omit the authorization processing is equal to or less than a difference obtained by subtracting the number of object pieces required to restore the object from the number of pieces into which the object is divided, and a value less than the number of object pieces required to restore the object.

Besides, the CPU 201 may set the number of DCs which omit the authorization processing to the value equal to or less than min(k−1, n−k) and set a value obtained by subtracting the set value from n as the number of DCs which perform the authorization processing.

The CPU 201 sets the number of DCs which omit the authorization processing, and thereby can reduce the time required for the processing while maintaining security.

In this embodiment, the CPU 201 sets the number of DCs which need the authorization processing to max(n−k+1, k)=max(4−3+1, 3)=max(2, 3)=3, and sets the number of DCs which omit the authorization processing to 4−3=1.

When the number of DCs which perform the authorization processing is n, there is no effect of reducing the processing time. Therefore, the CPU 201 may set the number of DCs which perform the authorization processing to a value equal to or more than max(n−k+1, k) and less than n. Besides, the CPU 201 may set the number of DCs which omit the authorization processing to a value equal to or less than min(k−1, n−k) and equal to or more than 1.

At S502, the CPU 201 acquires the communication time of the authorization request server in each DC.

In this embodiment, the CPU 201 performs the following processing for each authorization request server of the plurality of authorization request servers included in the object management system. More specifically, the CPU 201 acquires the time required for communication between the authorization request server and the metadata management server 103, as the communication time of the authorization request server. In this case, the acquired communication time of the authorization request server is a communication time that can be reduced by omitting the authorization processing. The CPU 201 decides, at S503, the authorization request servers which omit the authorization request processing, in the order from the authorization request server requiring a longer communication time that can be reduced by omission of the authorization processing among the plurality of authorization request servers included in the object management system. Thus, the CPU 201 can maximize the amount of reduction in the communication time of the communication performed by the plurality of authorization request servers included in the object management system.

Further, the CPU 201 may acquire, as the communication time of the authorization request server, a sum of the time required for the communication between the authorization request server and the control server 101 and the time required for the communication between the authorization request server and the metadata management server 103. The CPU 201 then decides, at S503, as the authorization request servers which omit the authorization request processing, those in the order from the authorization request server requiring a longer communication time among the plurality of authorization request servers included in the object management system. Thus, the CPU 201 can reduce the communication time of the authorization request server requiring the longest time for communication, among the plurality of authorization request servers included in the object management system.

Further, the object management system can complete the operation of the object by completing the operation regarding the k object pieces among the n object pieces. Therefore, to complete the operation of the object earliest, the object management system only needs to complete the operation requests regarding the k pieces earliest among the operation requests regarding the n object pieces.

The operations regarding the object pieces are performed in parallel. Therefore, the time required for completion of the operations regarding the k object pieces is equal to the time required for completion of the operation regarding the object piece which is completed k-th. In other words, when the communication time relating to the operation request which is completed k-th among the operation requests regarding the n object pieces is the shortest, the operation of the object is completed earliest.

Besides, the communication processing in the processing relating to the operation request regarding the object piece sometimes requires a longer time than that of other processing. Therefore, as the time required for the communication processing relating to the operation request regarding the object piece is shorter, the processing relating to the operation request regarding the object piece is completed earlier. In this embodiment, the communication processing relating to the operation request regarding the object piece is performed via the authorization request server, and can therefore be considered to be equal to the communication processing performed by the authorization request server.

Hence, the CPU 201 may perform the following processing. The CPU 201 acquires, as the communication time of the authorization request server in the case of performing the authorization request processing, a sum of the time required for the communication between the authorization request server and the control server 101 and the time required for the communication between the authorization request server and the metadata management server 103. The CPU 201 further acquires the time required for the communication between the authorization request server and the control server 101, as the communication time of the authorization request server when the authorization request processing of the authorization request server is omitted. Then, at S503, the CPU 201 performs the following processing based on the acquired communication time of the authorization request server. More specifically, the CPU 201 may decide the authorization request servers which omit the authorization request processing so that the value at k-th ranking counted from the smallest value among the communication times of the plurality of authorization request servers included in the object management system is smallest. This processing will be described later in FIG. 5. Thus, the CPU 201 can make shortest the time required for completion of the operation of the object.

In this embodiment, the CPU 201 acquires the communication time of each of the plurality of authorization request servers by communicating with each of the plurality of authorization request servers included in the object management system and measuring the time required for the communication.

Alternatively, the CPU 201 can communicate with the control server 101 via each of the plurality of authorization request servers included in the object management system, and measure the time required for the communication. In this case, the CPU 201 acquires a sum of the communication time between each of the plurality of authorization request servers and the control server 101 and the communication time between each of the plurality of authorization request servers and the metadata management server 103.

Further, the CPU 201 may acquire the communication time of each authorization request server as follows. Each of the plurality of authorization request servers actually communicates with the metadata management server 103 and measure the time required for the communication. Each authorization request server then transmits the measured time required for the communication, to the metadata management server 103. Thus, the CPU 201 may acquire the received communication time of each authorization request server as the communication time of each authorization request server. Further, each of the plurality of authorization request servers can also actually communicate with the control server 101, measure the time required for the communication, and transmit information on the measured time to the metadata management server 103.

Besides, the control server 101 may actually communicate with the metadata management server 103 via each of the plurality of authorization request servers included in the object management system and measure the time required for the communication. In this case, the control server 101 acquires a sum of the communication time between each of the plurality of authorization request servers and the control server 101 and the communication time between each of the authorization request servers and the metadata management server 103. Further, the control server 101 may transmit information on the acquired time to the metadata management server 103.

Further, it is assumed that the communication time of each authorization request servers is recorded in the setting data or the like stored in the auxiliary storage device 203 or the like in advance, the CPU 201 may acquire the communication time of each authorization request server by reading the setting data.

In this embodiment, the CPU 201 acquires the communication times of the authorization request servers 104, 106, 108, 110 corresponding to the DCs 1 to 4 respectively. In this embodiment, it is assumed that the authorization request server 110 in the DC4 is the authorization request server requiring the longest time for the communication with the metadata management server 103, among the authorization request servers 104, 106, 108, 110.

At S503, the CPU 201 decides the DCs which omit authorization processing, based on the number of DCs which can omit the authorization processing set at S501 and the communication time of each of the plurality of authorization request servers included in the object management system acquired at S502.

More specifically, the CPU 201 decides, as the authorization request servers which omit the authorization request processing, the authorization request servers corresponding to the number set at S501 in order from the authorization request server requiring the largest length of the communication time acquired at S502 among the plurality of authorization request servers in the object management system. Then, the CPU 201 decides the DCs corresponding to the decided authorization request servers which omit the authorization request processing, as the DCs which omit the authorization processing.

Further, the CPU 201 performs, at S502, the same processing also in the case of acquiring, as the communication time of the authorization request server, the sum of the time required for the communication between the authorization request server and the control server 101 and the time required for the communication between the authorization request server and the metadata management server 103.

Figure 5:
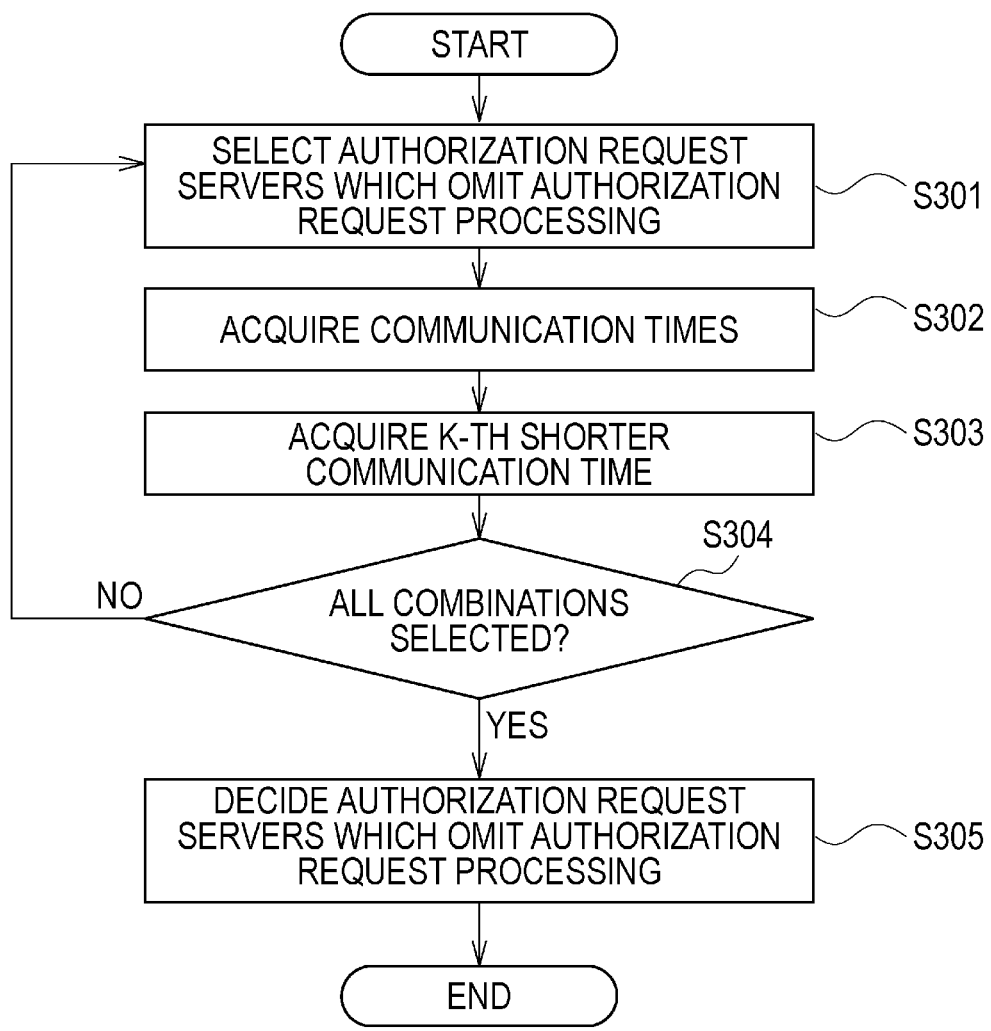
FIG. 5 is a flowchart illustrating an example of decision processing of the authorization request servers which omit the authorization request processing.

FIG. 5 is a flowchart illustrating an example of decision processing of the authorization request servers which omit the authorization request processing. FIG. 5 illustrates an example of processing at S503 when the communication time of the authorization request server in the case of performing the authorization request processing and the communication time of the authorization request server in the case of omitting the authorization request processing have been acquired at S502. As an example of the communication time of the authorization request server in the case of performing the authorization request processing is a sum of the time required for the communication between the authorization request server and the control server 101 and the time required for the communication between the authorization request server and the metadata management server 103. An example of the communication time of the authorization request server in the case of omitting the authorization request processing is the time required for the communication between the authorization request server and the control server 101.

At S301, the CPU 201 selects the authorization request servers which omit the authorization request processing corresponding to the number of DCs which can omit the authorization processing set at S501 among the plurality of authorization request servers included in the object management system.

At S302, the CPU 201 acquires the communication times in the case of omitting the authorization request processing regarding the authorization request servers decided at S301, from the communication times of the authorization request servers in the case of omitting the authorization request processing acquired at S502. Further, the CPU 201 acquires the communication times in the case of performing the authorization request processing regarding the other authorization request servers among the plurality of authorization request servers included in the object management system, from the communication times of the authorization request servers in the case of performing the authorization request processing acquired at S502.

At S303, the CPU 201 acquires a k-th smaller value among the communication times acquired at S302 respectively for the plurality of authorization request servers included in the object management system. The CPU 201 stores information on the authorization request servers selected at S301 in association with the acquired value, in the main storage device 202 or the like.

At S304, the CPU 201 determines whether the processing at S301 to S303 has been performed on all of combinations in the case of selecting the authorization request servers of the number set at S501 from the plurality of authorization request servers included in the object management system. If determined that the processing at S301 to S303 has been performed on all of the combinations, the CPU 201 proceeds to processing at S305. If determined that the processing at S301 to S303 has not been performed on all of the combinations, the CPU 201 proceeds to processing at S301.

At S305, the CPU 201 specifies the shortest communication time from the communication times acquired at S303, and specifies the authorization request servers which omit the authorization request processing selected at S301 corresponding to the specified value. More specifically, the CPU 201 acquires the information on the authorization request servers stored in the main storage device 202 or the like in association with the specified value, and thereby specifies the authorization request servers selected at S301 corresponding to the specified value. Then, the CPU 201 decides the specified authorization request servers as the authorization request servers which omit the authorization request processing.

From the processing in FIG. 5, the CPU 201 can decide the authorization request servers which omit the authorization request processing to complete the operation of the object earliest.

In this embodiment, at S503, the CPU 201 decides one of the DCs 1 to 4, in which the corresponding authorization request server requires a longer time for communication, as the DC which omits the authorization processing. Since the DC corresponding to the authorization request server requiring the longest time for communication is the DC4, the CPU 201 decides, at S503, the DC4 as the DC which omits the authorization processing. The CPU 201 manages the necessity of the authorization processing regarding each DC by data format such as table or the like. FIG. 6 is an example of the table required for managing the necessity of the authorization processing regarding each DC.

At S504, the CPU 201 transmits authorization necessity information being information indicating whether each of the authorization request servers is the authorization request server which omits the authorization request processing, to each of the authorization request servers in the object management system. This enables each authorization request server to grasp whether to execute the authorization request processing, based on the transmitted authorization necessity information.

More specifically, the CPU 201 transmits information indicating that execution of the authorization necessity processing is not necessary, as the authorization necessity information, to the authorization request servers corresponding to the DCs decided at S503 as the DCs which omit the authorization processing. The CPU 201 further transmits information indicating that execution of the authorization request processing is necessary, as the authorization necessity information, to the authorization request servers except the authorization request servers corresponding to the DCs decided at S503 as the DCs which omit the authorization processing. The processing at S504 is an example of necessity information transmission processing.

Further, the CPU 201 may transmit information indicating whether each of all of the authorization request servers omits the authorization request processing, as the authorization necessity information, to each of all of the authorization request servers.

In this embodiment, the CPU 201 decides the DC which omits the authorization processing, based on the communication time of each of the plurality of authorization request servers included in the object management system. However, the CPU 201 may decide the DC which omits the authorization processing, based on the communication speed of each authorization request server. In this case, the CPU 201 acquires, at 502, information on the communication speed from each authorization request server. Then, the CPU 201 decides, at S503, the authorization request servers corresponding to the number set at S501 from the authorization request server having a lower communication speed acquired at S502 among the authorization request servers in the object management system, as the authorization request servers which omit the authorization request processing. This enables the CPU 201 to appropriately decide the authorization request servers which omit the authorization request processing when the CPU 201 cannot acquire the information on the communication time but can acquire the communication speed.

In this embodiment, the main body performing the processing in FIG. 4 is the metadata management server 103. However, the main body performing the processing of deciding the DCs which omit the authorization processing is not limited to the metadata management server 103 but may be the control server 101 or other external devices.

In this embodiment, the metadata management server 103 transmits the information indicating whether each of the plurality of authorization request servers is the authorization request server which omits the authorization request processing, to each of the plurality of authorization request servers included in the object management system. However, each of the plurality of authorization request servers included in the object management system may save the same information as that transmitted at S504 in the auxiliary storage device or the like in advance.

The CPU 201 performs the processing in FIG. 4 before the operation of the object is performed. Further, the CPU 201 may transmit the information indicating whether to omit the authorization request processing, to each of the plurality of authorization request servers in the object management system, by performing the processing in FIG. 4 periodically every month, every week or the like.

In this embodiment, the object management system includes one control server but may include a plurality of control servers. In the case where the object management system in this embodiment is used in a plurality of companies, it is desirable to use a control server different for each company. In the case where a plurality of control servers are used, the CPU 201 acquires, at S502, the communication time regarding each of the control servers, and decides, at S503, the DCs which omit the authorization processing for each of the control servers.

Figure 7:
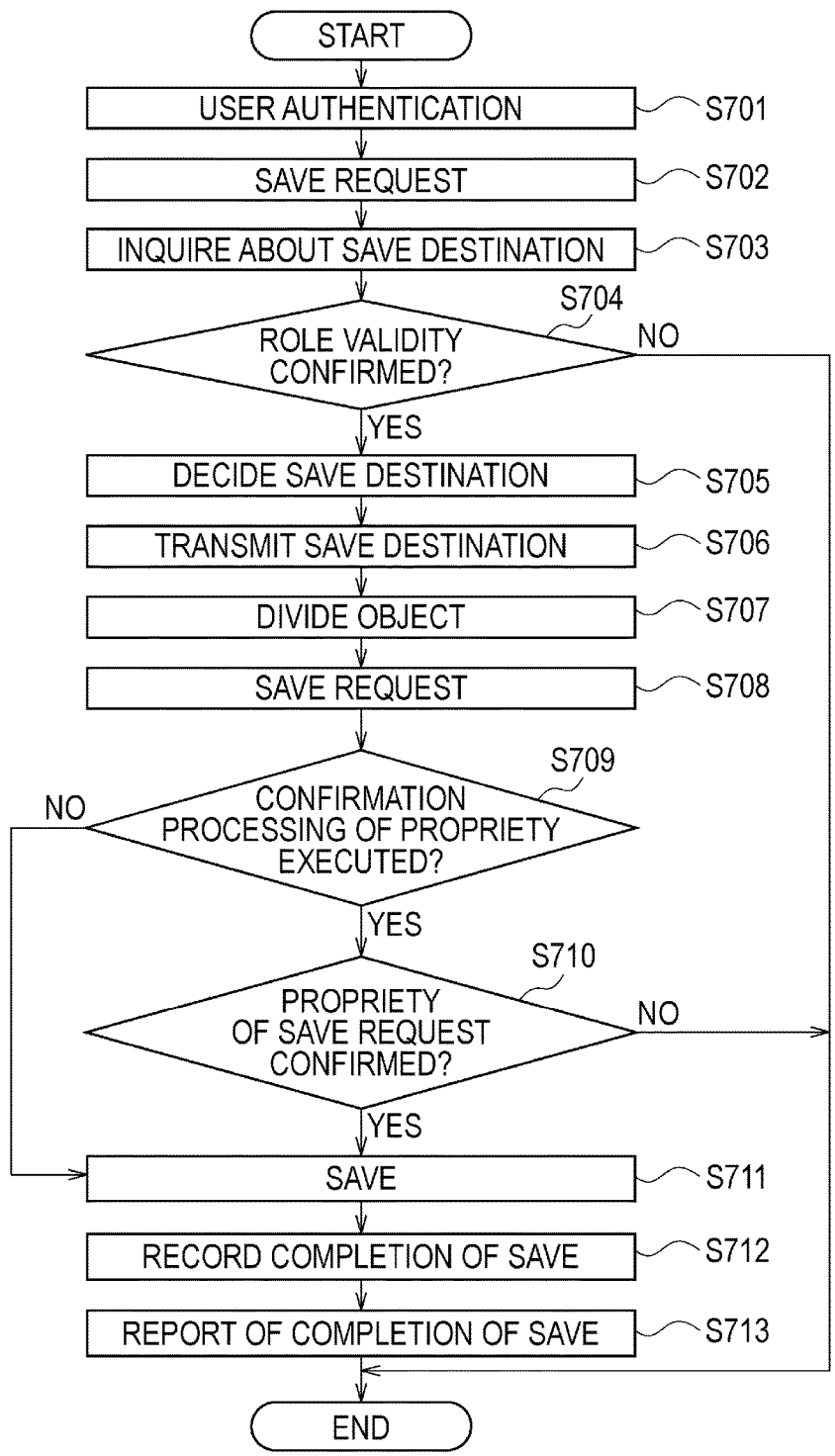
FIG. 7 is a flowchart illustrating an example of save processing of the object by the object management system.

FIG. 7 is a flowchart illustrating an example of save processing of the object by the object management system.

At S701, the authentication request unit 401 of the client PC 100 transmits the user ID and password to the authentication server 102 to thereby transmit the authorization request regarding the user. The processing of the client PC 100 at S701 is an example of authentication request transmission processing.

The authentication unit 421 of the authentication server 102 authenticates the user by comparing the user ID and password transmitted from the client PC 100 with the authentication information stored in the authentication information storage unit 423.

More specifically, the authentication unit 421 performs the authentication processing of the user by determining whether there is a combination of the transmitted user ID and password in the authentication information stored in the authentication information storage unit 423. If determined that the combination of the transmitted user ID and password exists in the authentication information stored in the authentication information storage unit 423, the authentication unit 421 recognizes that the authentication of the user could be performed. If determined that the combination of the transmitted user ID and password does not exist in the authentication information stored in the authentication information storage unit 423, the authentication unit 421 recognizes that the authentication of the user could not be performed. When the authentication of the user could be performed, the authentication unit 421 transmits the SID to the client PC 100.

At S702, the save/acquisition request unit 402 transmits the save request of the object including the data on the object being the save target, the object name, the virtual path of the save destination of the object, and the SID transmitted at S701, to the control server 101. Upon receiving the save request of the object from the client PC 100, the control unit 411 of the control server 101 analyzes the data on the object being the save target included in the received save request to acquire object information (data size, type and so on).

At S703, the control unit 411 transmits an inquiry about the save destination of the object including the object name, the virtual path of the save destination of the object, the SID, and the object information acquired at S702, to the metadata management server 103.

At S704, upon receiving the inquiry about the save destination of the object at S703, the distribution destination designation unit 431 of the metadata management server 103 performs the following processing. More specifically, the distribution destination designation unit 431 extracts the role ID writable in the virtual path included in the received save destination inquiry, from the authority information stored in the metadata storage unit 433. Then, the distribution destination designation unit 431 transmits a validity confirmation request of the role including the extracted role ID and the SID included in the received save destination inquiry, to the authentication server 102. The processing of the distribution destination designation unit 431 at S704 is an example of confirmation request transmission processing.

Upon receiving the validity confirmation request of the role, the role confirmation unit 422 of the authentication server 102 specifies the user corresponding to the SID included in the received validity confirmation request, from the session information stored in the authentication information storage unit 423. The role confirmation unit 422 confirms whether the specified user has the role corresponding to the role ID included in the validity confirmation request, based on the role information stored in the authentication information storage unit 423.

More specifically, the role confirmation unit 422 determines whether a combination of the specified user and the role of the role ID included in the validity confirmation request exists in the role information stored in the authentication information storage unit 423. If determined that the combination of the specified user and the role of the role ID included in the validity confirmation request exists in the role information stored in the authentication information storage unit 423, the role confirmation unit 422 confirms that the role of the user is valid. If determined that the combination of the specified user and the role of the role ID included in the validity confirmation request does not exist in the role information stored in the authentication information storage unit 423, the role confirmation unit 422 confirms that the role of the user is not valid.

The role confirmation unit 422 transmits the result of the validity confirmation of the role of the user to the metadata management server 103. When the result of the role validity confirmation received from the authentication server 102 is a result indicating that the role of the user is valid, the distribution destination designation unit 431 proceeds to processing at S705. When the result of the role validity confirmation received from the authentication server 102 is a result indicating that the role of the user is not valid, the distribution destination designation unit 431 ends the processing in FIG. 7.

At S705, the distribution destination designation unit 431 acquires the number n into which the object being the save target is to be divided, from a setting file stored in the auxiliary storage device 203 or the like. The distribution destination designation unit 431 decides an object piece ID, a save request destination (the authorization request server, the path of save destination), and an SS request ID (hereinafter, referred to as an SSRID), for each of the object pieces of the object to be divided into n pieces. The distribution destination designation unit 431 then stores the object name and the virtual path of the save destination of the object received at S704, and the decided object piece ID, save request destination, and SSRID, as save request destination information, in the auxiliary storage device 203 or the like. In this embodiment, the distribution destination designation unit 431 stores four pieces of save request destination information.

At S706, the distribution destination designation unit 431 transmits the save request destination information regarding each of the object pieces of the object to the control server 101. The save request destination information on the object piece is, for example, a combination of the object piece ID, the information on the authorization request server being the save request destination of the object piece, the information on the save destination path, and the SSRID. In this embodiment, the distribution destination designation unit 431 transmits the save request destination information on four object pieces to the control server 101. The processing at S706 is an example of request destination transmission processing.

At S707, the division unit 412 divides the object being the save target into n pieces so that the original object can be restored from k (k≤n) object pieces. In this embodiment, the division unit 412 divides the object being the save target into four object pieces so that the original object can be restored from three object pieces.

At S708, the control unit 411 performs the following processing for each of the object pieces of the object being the save target divided at S707. More specifically, the control unit 411 transmits the save request of the object piece including the data on the object piece, the object piece ID, the SSRID, and the information on the save destination path, to the authorization request server being the save request destination designated by the save request destination information transmitted at S706. In this embodiment, the control unit 411 transmits the save requests of the four object pieces to the authorization request servers 104, 106, 108, 110 respectively. The processing at S708 is an example of operation request transmission processing of the object.

At S709, the authorization request unit of the authorization request server to which the save request of the object piece has been transmitted at S708 performs the following processing. More specifically, the authorization request unit determines whether to transmit the authorization request for the transmitted save request to the metadata management server 103 (whether to execute processing of confirming the propriety of the transmitted save request with the metadata management server 103), based on the information indicating whether the authorization request server is the authorization request server which omits the authorization request processing transmitted at S504. Further, the authorization request unit may determine whether to transmit the authorization request for the save request of the object piece to the metadata management server 103, based on the information indicating whether to perform the authorization request processing saved in the auxiliary storage device or the like in advance.

More specifically, when the information transmitted at S504 is information indicating the authorization request server which omits the authorization request processing, the authorization request unit determines not to transmit the authorization request for the save request of the object piece to the metadata management server 103. Further, when the information transmitted at S504 is information indicating the authorization request server which performs the authorization request processing, the authorization request unit determines to transmit the authorization request for the save request of the object piece to the metadata management server 103.

Then, if determined to transmit the transmitted authorization request for the save request to the metadata management server 103 based on the information transmitted at S504, the authorization request unit proceeds to processing at S710. Besides, if determined not to transmit the authorization request for the save request of the object pierce of the object to the metadata management server 103 based on the information transmitted at S504, the authorization request unit proceeds to processing at S711.

In this embodiment, as illustrated in FIG. 6, the DC which omits the authorization processing is the DC4, and the other DCs are authorization request servers which perform the authorization processing. Therefore, the authorization request servers 104, 106, 108 determine to transmit the authorization requests for the save requests of the object pierces to the metadata management server 103. Further, the authorization request server 110 determines not to transmit the authorization request for the save request of the object pierce to the metadata management server 103.

At S710, the authorization request unit determined to transmit the authorization request at S709 transmits the authorization request regarding the save request including the object piece ID, the SSRID, and the information on the save destination path included in the save request received at S708, to the metadata management server 103. The processing, at S710, of the authorization request unit determined to transmit the authorization request at S709 is an example of authorization request transmission processing.

The authorization unit 432 performs authorization processing regarding the save request of the objet piece, based on the object piece ID, the SSRID, and the information on the save destination path included in the received authorization request, the information on the authorization request server transmitted the authorization request, and the information saved as the save request destination information at S705. More specifically, the authorization unit 432 determines whether there is, in the information saved as the save request destination information at S705, some information agreeing with a combination of the object piece ID, the SSRID, and the information on the save destination path included in the received authorization request and the information on the authorization request server transmitted the authorization request. If determined that there is agreeing information, the authorization unit 432 recognizes that save request corresponding to the received authorization request could be authorized, and if determined that there is no agreeing information, the authorization unit 432 recognizes that save request corresponding to the received authorization request could not be authorized.

The authorization unit 432 transmits the result of the authorization processing to the authorization request server transmitted the authorization request.

Upon receiving the information indicating that the save request could not be authorized as a result of the authorization processing from the metadata management server 103, the authorization request unit transmits information indicating that the authorization regarding the save request from the control server 101 has been failed, to the control server 101. Upon receiving the information indicating that the authorization regarding the save requests of the number set to be equal to or more than n−k+1 has been failed, the control unit 411 recognizes that the propriety of the save request of the object could not be confirmed, and ends the processing in FIG. 7.

At S711, the authorization request server determined not to transmit the authorization request at S709 requests the save server in the same DC to save the data on the object piece included in the save request received at S708, based on the information on the save destination path. Further, the authorization request server received the information indicating that the authorization could be made at S710 also similarly requests the save server in the same DC to save the data on the object piece included in the save request received at S708.

The save server requested to save the data on the object piece saves the data on the object piece in the storage unit. Then, the save server transmits report of completion of the save processing to the authorization request server which has requested to save the object piece.

At S712, the authorization request server received the report of completion of the save processing at S711 transmits the received report of completion of the save processing to the control server 101. The control server 101 transmits the received report of completion of the save processing to the metadata management server 103.

When the number of completion reports received from the control server 101 reaches the number set to be equal to or more than k, the metadata management server 103 transmits information indicating completion of saving the object to the control server 101. The metadata management server 103 does not need to wait for completion of saving all of the object pieces.

At S713, the control server 101 transmits information indicating that save of the object has been completed, to the client PC 100.

Figure 8:
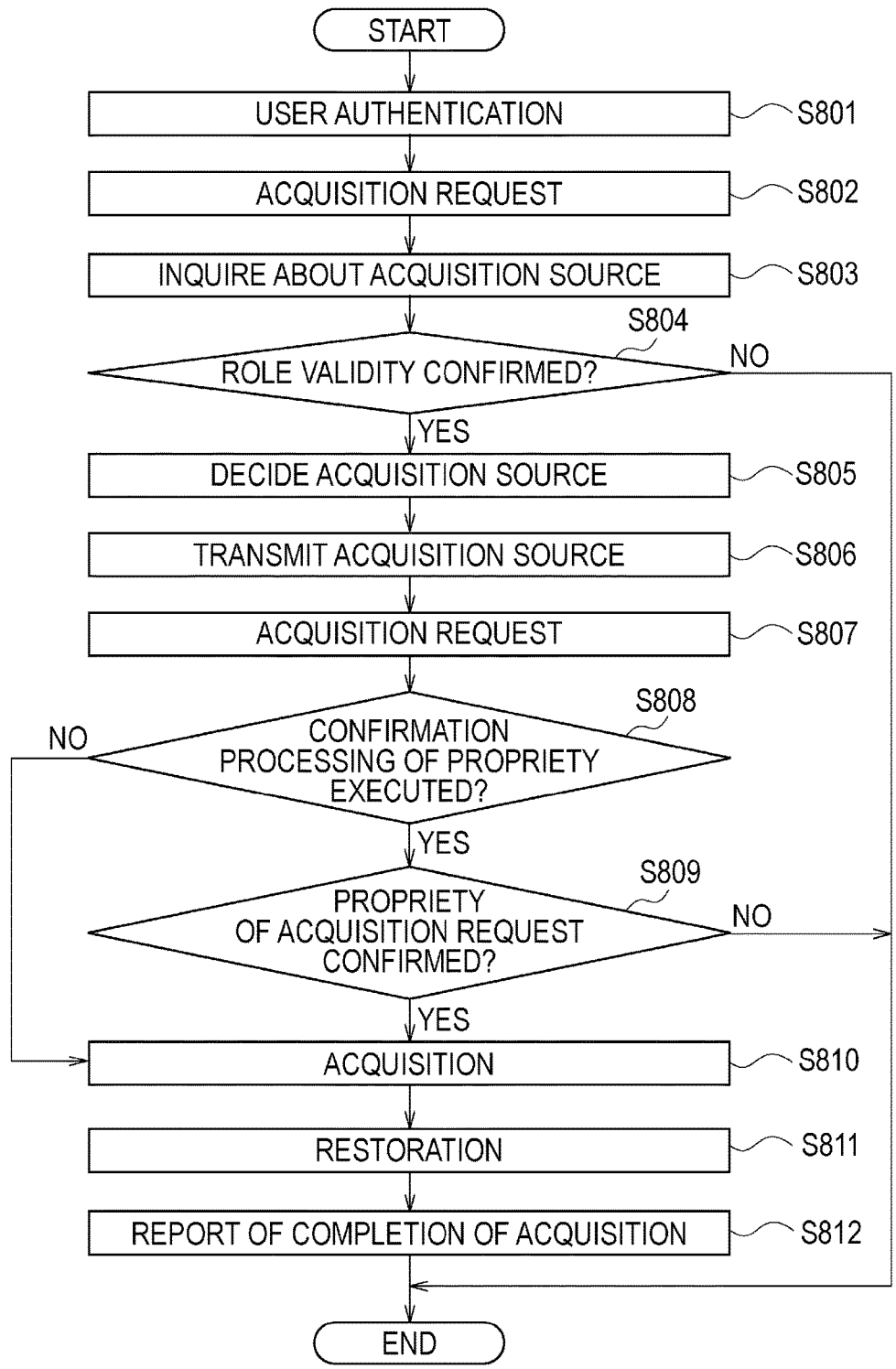
FIG. 8 is a flowchart illustrating an example of acquisition processing of the object by the object management system.

FIG. 8 is a flowchart illustrating an example of acquisition processing of the object by the object management system.

Processing at S801 is the same as that at S701.

At S802, the save/acquisition request unit 402 transmits the acquisition request of the object including the object name, the virtual path of the acquisition source of the object, and the SID transmitted at S801, to the control server 101.

At S803, the control unit 411 transmits an inquiry about the acquisition source of the object including the object name, the virtual path of the acquisition source of the object, and the SID, to the metadata management server 103.

At S804, upon receiving the inquiry about the acquisition source of the object at S803, the distribution destination designation unit 431 performs the following processing. More specifically, the distribution destination designation unit 431 extracts the role ID readable out to the virtual path included in the received acquisition source inquiry, from the authority information stored in the metadata storage unit 433. Then, the distribution destination designation unit 431 transmits the validity confirmation request of the role including the extracted role ID and the SID included in the received acquisition source inquiry, to the authentication server 102.

Upon receiving the validity confirmation request of the role, the role confirmation unit 422 of the authentication server 102 specifies the user corresponding to the SID included in the received validity confirmation request, from the session information stored in the authentication information storage unit 423. The role confirmation unit 422 confirms whether the specified user has the role corresponding to the role ID included in the validity confirmation request, based on the role information stored in the authentication information storage unit 423.

More specifically, the role confirmation unit 422 determines whether a combination of the specified user and the role of the role ID included in the validity confirmation request exists in the role information stored in the authentication information storage unit 423. If determined that the combination of the specified user and the role of the role ID included in the validity confirmation request exists in the role information stored in the authentication information storage unit 423, the role confirmation unit 422 confirms that the role of the user is valid. If determined that the combination of the specified user and the role of the role ID included in the validity confirmation request does not exist in the role information stored in the authentication information storage unit 423, the role confirmation unit 422 confirms that the role of the user is not valid.

The role confirmation unit 422 transmits the result of the validity confirmation of the role of the user to the metadata management server 103. When the result of the role validity confirmation received from the authentication server 102 is a result indicating that the role of the user is valid, the distribution destination designation unit 431 proceeds to processing at S805. When the result of the role validity confirmation received from the authentication server 102 is a result indicating that the role of the user is not valid, the distribution destination designation unit 431 ends the processing in FIG. 8.

At S805, the distribution destination designation unit 431 acquires the number n indicating how many object pieces the object being the save target is divided into and saved, from a setting file stored in the auxiliary storage device 203 or the like. At S705, the distribution destination designation unit 431 retrieves the object name and the virtual path of the object from the save request destination information stored in the auxiliary storage device 203 or the like to thereby acquire the object piece ID and an acquisition request destination (the authorization request server, the path of the acquisition source) for each of the n object pieces of the object being an acquisition target. The distribution destination designation unit 431 decides an SS request ID for each of the object pieces. The distribution destination designation unit 431 then stores the acquired information and the decided SSRID, as acquisition request destination information, in the auxiliary storage device 203 or the like. In this embodiment, the distribution destination designation unit 431 stores four pieces of acquisition request destination information.

At S806, the distribution destination designation unit 431 transmits the acquisition request destination information on the object piece of the object including the object piece ID of the object being the acquisition target, the information on the authorization request server being the acquisition request destination of the object piece, the information on the acquisition source path, and the SSRID, to the control server 101. In this embodiment, the distribution destination designation unit 431 transmits the acquisition request destination information on four object pieces to the control server 101.

At S807, the control unit 411 transmits the acquisition request of the object piece including the object piece ID, the SSRID, and the information on the acquisition source path, to the authorization request server corresponding to the acquisition source designated by the acquisition request destination information received at S806. In this embodiment, the control unit 411 transmits the acquisition requests of four object pieces to the authorization request servers 104, 106, 108, 110 respectively.

At S808, the authorization request unit of the authorization request server to which the acquisition request of the object piece has been transmitted at S807 performs the following processing. More specifically, the authorization request unit determines whether to transmit the authorization request for the transmitted acquisition request to the metadata management server 103 (whether to execute the processing of confirming the propriety of the transmitted acquisition request to the metadata management server 103), based on the information transmitted at S504 indicating whether the authorization request server is the authorization request server which omits the authorization request processing. Further, the authorization request unit may determine whether to transmit the authorization request for the acquisition request of the object to the metadata management server 103, based on the information indicating whether to perform the authorization request processing saved in the auxiliary storage device or the like in advance.

More specifically, when the information transmitted at S504 is information indicating the authorization request server which omits the authorization request processing, the authorization request unit determines not to transmit the authorization request for the acquisition request of the object piece to the metadata management server 103. Besides, when the information transmitted at S504 is information indicating the authorization request server which performs the authorization request processing, the authorization request unit determines to transmit the authorization request for the acquisition request of the object piece to the metadata management server 103.

Then, if determined to transmit the transmitted authorization request for the acquisition request of the object piece to the metadata management server 103, the authorization request unit proceeds to processing at S809. Besides, if determined not to transmit the authorization request for the acquisition request of the object piece of the object to the metadata management server 103, the authorization request unit proceeds to processing at S810.

In this embodiment, as illustrated in FIG. 6, the DC which omits the authorization processing is the DC4, and the other DCs are authorization request servers which perform the authorization processing. Therefore, the authorization request servers 104, 106, 108 determine to transmit the authorization requests for the acquisition requests of the object pierces to the metadata management server 103.

Further, the authorization request server 110 determines not to transmit the authorization request for the acquisition request of the object pierce to the metadata management server 103.

At S809, the authorization request unit determined to transmit the authorization request at S808 transmits the authorization request regarding the acquisition request including the object piece ID, the SSRID, and the information on the acquisition source path included in the acquisition request received at S807, to the metadata management server 103.

The authorization unit 432 performs authorization processing regarding the acquisition request of the objet piece, based on the object piece ID, the SSRID, and the information on the acquisition source path included in the received authorization request, the information on the authorization request server transmitted the authorization request, and the information saved as the acquisition request destination information at S805. More specifically, the authorization unit 432 determines that there is, in the information saved as the acquisition request destination information at S805, some information agreeing with a combination of the object piece ID, the SSRID, and the information on the acquisition source path included in the received authorization request, and the information on the authorization request server transmitted the authorization request. If determined that there is agreeing information, the authorization unit 432 recognizes that acquisition request corresponding to the received authorization request could be authorized, and if determined that there is no agreeing information, the authorization unit 432 recognizes that acquisition request corresponding to the received authorization request could not be authorized.

The authorization unit 432 transmits the result of the authorization processing to the authorization request server transmitted the authorization request.

Upon receiving the information indicating that the acquisition request of the object piece could not be authorized as a result of the authorization processing from the metadata management server 103, the authorization request unit transmits information indicating that the authorization regarding the acquisition request of the object piece from the control server 101 has been failed. Upon receiving the information indicating that the authorization regarding the acquisition requests of the object pieces of the number set to be equal to or more than n−k+1 has been failed, the control unit 411 recognizes that the propriety of the acquisition request of the object could not be confirmed, and ends the processing in FIG. 8.

At S810, the authorization request server determined not to transmit the authorization request at S808 requests the save server in the same DC to acquire the data on the object piece corresponding to the object piece ID included in the acquisition request received at S807, based on the information on the acquisition source path. Further, the authorization request server received the information indicating that the authorization could be made at S809 also similarly requests the save server in the same DC to acquire the data on the object piece corresponding to the object piece ID included in the acquisition request received at S807.

The save server requested to acquire the data on the object piece acquires the data on the corresponding object piece from the storage unit. Then, the save server transmits the acquired data on the object piece, to the authorization request server which has requested to save the object piece.

At S811, the authorization request server received the data on the object piece at S810 transmits the received data on the object piece to the control server 101. When the number of pieces of received data on the object pieces reaches k, the restoration unit 413 of the control server 101 restores the original object from the data on the object pieces.

At S812, the control server 101 transmits data on the object restored at S811 to the client PC 100, and transmits information indicating completion of acquisition of the object to the metadata management server 103.

According to the above processing in this embodiment, the object management system can prevent increase in communication time required for the operation of the object.

<Embodiment 2>

In the embodiment 1, one save server is included in each of the DCs included in the object management system. Specifically, each of the DCs is in one-to-one correspondence with the save server being an actual save destination of the object piece. Therefore, decision of the DC which does not need the authorization processing can be recognized as decision of the save server which does not need the authorization processing. In other words, the object management system can decide the save server which does not need the authorization processing by deciding the DC which omits authorization processing. As described above, the object management system can prevent increase in communication time relating to the authorization processing by appropriately deciding the save server which does not need the authorization processing. The save server is an example of a save unit that saves an object or an object piece.

However, the DC sometimes includes a plurality of save servers. In this case, the object management system cannot decide the save server which does not need the authorization processing by deciding the DC which omits authorization processing.

Figure 9:
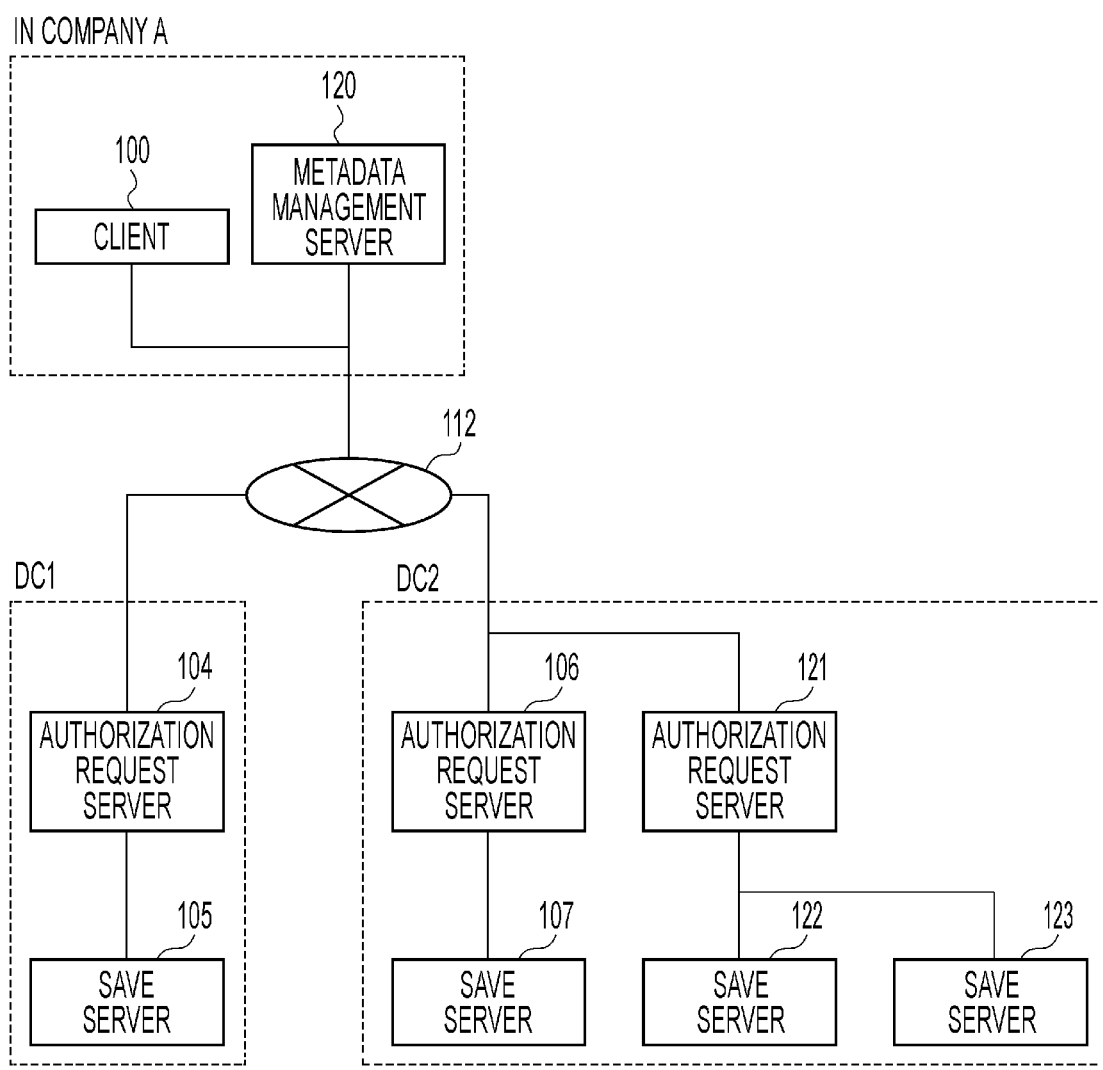
FIG. 9 is a diagram illustrating an example of the system configuration of the object management system.

FIG. 9 is a diagram illustrating an example of the system configuration of the object management system in this embodiment. The system configuration in FIG. 9 is different from the system configuration in FIG. 1 in that a metadata management server 120 is included in place of the control server 101 in the company A, that the authentication server 102 and the metadata management server 103 are not included in the DC1, that an authorization request server 121 is included in addition to the authorization request server 106 in the DC2, that save servers 122, 123 connected to the authorization request server 121 are included in the DC2, and that the DCs 3,4 do not exist. In other words, a plurality of authorization request servers exist in the DC2. Further, the plurality of authorization request servers are connected to the authorization request server 121 in the DC2.

The details of hardware configurations and functional configurations of components given the same numerals as those in FIG. 1 among components of the object management system in this embodiment are the same as those in the embodiment 1. The hardware configuration of the metadata management server 120 is the same as the hardware configuration of the metadata management server 103 in FIG. 2. Further, the functional configuration of the metadata management server 120 is a configuration including all of the functional components of the control server 101, the authentication server 102, and the metadata management server 103 in FIGS. 3B, 3C, 3D. More specifically, the metadata management server 120 takes all of roles of the control server 101, the authentication server 102, and the metadata management server 103. The hardware configuration and the functional configuration of the authorization request server 121 are the same as those of the authorization request servers 104, 106. The hardware configurations and the functional configurations of the save servers 122, 123 are the same as those of the save servers 105, 107.

The processing in this embodiment will be described. In this embodiment, it is assumed that the number n indicating how many object pieces an object is to be divided into is 3, the number k of object pieces required to restore the object is 2, and the authorization request server requiring the longest time for communication with the metadata management server 120 among the authorization request servers 104, 106, 121 is the authorization request server 104.

First, the CPU of the metadata management server 120 sets the number of save servers which do not need the authorization processing, based on k and n, by the same processing as that at S501.

The CPU of the metadata management server 120 sets the number of save servers which perform the authorization processing to a value equal to or more than max(n−k+1, k) as in the embodiment 1, and sets a value obtained by subtracting the set value from n as the number of save servers which omit the authorization processing. The CPU of the metadata management server 120 sets the number of save servers which need the authorization processing to a value equal to or more than max (3−2+1, 2)=2. When the number of save servers which need the authorization processing is 3, there is no effect of reducing the processing time, and therefore the CPU of the metadata management server 120 sets the number of save servers which need the authorization processing to 2. Then, the CPU of the metadata management server 120 sets the number of save servers which do not need the authorization processing to n−2=3−2=1.

The CPU of the metadata management server 120 acquires the communication time of the authorization request server in each DC. Since the authorization request server requiring the longest time for communication with the metadata management server 120 is the authorization request server 104, the CPU of the metadata management server 120 decides the save server 105 included in the DC1 as the save server which does not need the authorization processing.

Since the DC2 includes three save servers 107, 122, 123, the CPU of the metadata management server 120 decides any two of the save servers 107, 122, 123 as the save servers which need the authorization processing. The CPU of the metadata management server 120 may decide, by an arbitrary deciding method, any two of the save servers 107, 122, 123 as the save servers which need the authorization processing. The CPU of the metadata management server 120 may randomly, for instance, select two from the save servers 107, 122, 123 and decide the selected save servers as the save servers which need the authorization processing, or may preferentially select two save servers corresponding to the authorization request server requiring the shortest time for the communication with the metadata management server and decide them as the save servers which need the authorization processing. The save server not selected is a save server which is not used for saving the object.

The CPU 201 transmits the authorization necessity information indicating whether the authorization request processing is necessary, to each of the authorization request servers corresponding to the save servers which save the object pieces of the object.

According to the above processing in this embodiment, the object management system can appropriately decide the save destination of the object piece so as to prevent increase in communication time and processing time relating to the authorization processing even when a plurality of authorization request servers and save servers exist in the DC.

The object management system includes the authorization request server corresponding to two save servers in this embodiment, but may include an authorization request server corresponding to three or more save servers. Further, the two save servers existing in the DC are connected to one authorization request server in this embodiment, but all of save servers may be connected to one authorization request server, or each of the save servers may be connected in one-to-one correspondence with a different authorization request server. Further, the authorization request server and the save server are different devices in this embodiment. However, a single device including an authorization request unit and a storage unit may perform the processing of the authorization request server and the save server.

<Embodiment 3>

In the embodiment 1, the DC of the object management system includes one authorization request server. In this embodiment, a case where the object management system includes a DC including no authorization request server will be described.

Figure 10:
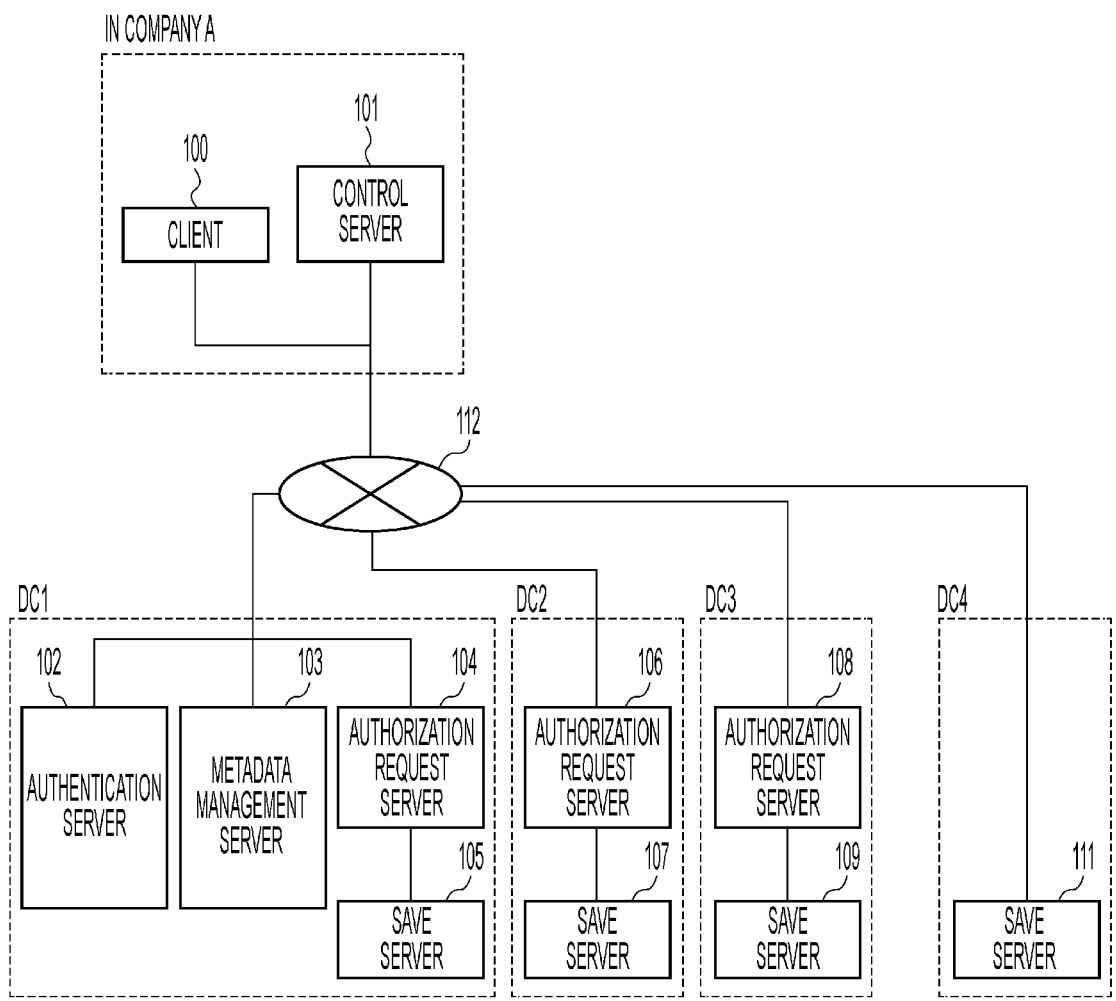
FIG. 10 is a diagram illustrating an example of the system configuration of the object management system.

FIG. 10 is a diagram illustrating an example of the system configuration of the object management system in this embodiment. The system configuration in FIG. 10 is different from the system configuration in FIG. 1 in that the authorization request server 110 does not exist in the DC4. In other words, the DC4 does not have the function of performing the authorization processing regarding the operation request to the save server 111.

The details of hardware configurations and functional configurations of components of the object management system in this embodiment are the same as those in the embodiment 1.

The processing in this embodiment will be described. In this embodiment, it is assumed that the number n indicating how many object pieces an object is to be divided into is 4, the number k of object pieces required to restore the object is 3, and the DC requiring the longest time for communication with the metadata management server 103 and so on among the DCs 1 to 4 is the DC4.

First, the CPU 201 sets the number of save servers which do not need the authorization processing, based on k and n, by the same processing as that at S501.

The CPU 201 sets the number of save servers which perform the authorization processing to a value equal to or more than max(n−k+1, k), and sets a value obtained by subtracting the set value from n as the number of save servers which omit the authorization processing as in the embodiment 1. The CPU 201 sets the number of save servers which need the authorization processing to a value equal to or more than max(4−3+1, 3)=3. When the number of save servers which need the authorization processing is 4, there is no effect of reducing the processing time, and therefore the CPU 201 sets the number of save servers which need the authorization processing to 3. Then, the CPU 201 sets the number of save servers which do not need the authorization processing to n−3=4−3=1.

After determining the number of save servers which do not need the authorization processing, first, the CPU 201 decides the set number of save servers among the save servers (the save servers not connected to the authorization request servers) included in the DC having no authorization function, as the save servers which do not need the authorization processing. In this embodiment, the CPU 201 decides one save server 111 as the save server which does not need the authorization processing. Then, the CPU 201 decides the save servers 105, 107, 109 as the save servers which need the authorization processing.

When the number of save servers not connected to the authorization request servers is less than the number of decided save servers which do not need the authorization processing, first, the CPU 201 decides all of the save servers not connected to the authorization request servers, as the save servers which do not need the authorization processing. Then, the CPU 201 decides the remaining save servers which do not need the authorization processing, based on the communication time regarding the authorization request server connected to each save server as in the embodiment 1.

According to the above processing in this embodiment, the object management system can appropriately decide the save destination of the object piece so as to prevent increase in communication time and processing time relating to the authorization processing even when the object management system includes the DC including no authorization request server.

Further, according to the processing in this embodiment, the object management system can maintain security of the object management system even when including some save servers which do not need the authorization processing.

<Other Embodiments>

Objects managed by the object management system include, for example, such an object that anyone who can access the object management system is permitted to acquire but only the person who has set the object is permitted to perform saving (overwriting, updating). Besides, the objects managed by the object management system include, for example, such an object that only the person who has set the object is permitted to acquire but anyone who can access the object management system saves. In such cases, if the object management system performs the authorization processing to all of the operation requests of the object, the object management system performs unnecessary authorization processing, resulting in increase in communication time and processing time relating to the unnecessary authorization processing.

Hence, the CPU 201 may transmit authorization necessity information to be applied only to the request for the save operation of the object to each authorization request server, for instance, in the embodiments 1 to 3. Conversely, the CPU 201 may transmit authorization necessity information to be applied only to the request for the acquisition operation of the object to each authorization request server. Then, each authorization request server performs the authorization request processing based on the authorization necessity information only when the set operation request of the object is made.

According to the above processing, the object management system can prevent increase in communication time and processing time relating to the unnecessary authorization processing.

In the embodiments 1 to 3, the object management system sets the number of save servers which do not need the authorization processing, based on the number indicating how many object pieces the object is to be divided into and the number of object pieces required to restore the object, and decides the save servers which omit the authorization request processing to thereby decide the save servers which do not need the authorization processing.

However, the object management system may set the number of save servers which need the authorization processing, based on the number indicating how many object pieces the object is to be divided into and the number of object pieces required to restore the object, and set a value obtained by subtracting the set number from the number indicating how many object pieces the object is to be divided into, as the number of save servers which do not need the authorization processing.

Further, the object management system may set the number of save servers which need the authorization processing, based on the number indicating how many object pieces the object is to be divided into and the number of object pieces required to restore the object, decide authorization request servers which perform the authorization request processing, and select the save servers which do not need the authorization processing from the save servers other than the save servers corresponding to the decided authorization request servers.

The number of save servers which do not need the authorization processing and the number of save servers which need the authorization processing, set based on the number indicating how many object pieces the object is to be divided into and the number of object pieces required to restore the object, are examples of authorization omission information being information indicating how many save units do not need the authorization processing.

The authorization request server in each embodiment is an example of the authorization request unit that makes a request for the authorization processing for the operation request of the object. Examples of the authorization request unit include an information processing device other than the server having the function of requesting the authorization processing, an application of realizing the function of requesting the authorization processing and the like in addition to the authorization request server.

The embodiments can be realized by a computer executing the programs. A computer-readable recording medium recording the above programs thereon and a computer program product of the above programs are also applicable as embodiments of the present invention. As the recording medium, for example, a flexible disk, a hard disk, an optical disk, a magneto-optical disk, a CD-ROM, a magnetic tape, a nonvolatile memory card, a ROM or the like can be used.

According to each of the above-described embodiments, the CPU of the metadata management server 103, 120 can reduce the amount of information exchanged in the object management system and thereby decrease the usage rate of the band of the network.

The preferable embodiments of the present invention have been described above in details, but the present invention is not limited to the specific embodiments.

For example, a part or all of the above-described functional configuration of the object management system may be implemented as hardware in the control server 101, the authentication server 102, and the metadata management server 103.

According to the present invention, increase in communication time required for operation of an object can be prevented.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An information processing device, comprising:
   a memory; and
   a processor coupled to the memory and configured to execute:
      a first acquisition unit that acquires authorization omission information being information indicating how many save units among a plurality of save units in which object pieces of an object divided into a division number are stored respectively do not need authorization processing, based on the division number indicating how many object pieces the object is to be divided into and a restoration number being a number of object pieces required to restore the object, wherein the authorization omission information comprises an omission number indicating a number of save units which do not need the authorization processing, based on the division number and the restoration number; and
      a decision unit that decides at least one save unit which does not need the authorization processing from among the plurality of save units, based on the authorization omission information acquired by the first acquisition unit.

2. The information processing device according to claim 1, wherein the processor is further configured to execute:
   a transmission unit that transmits, based on whether each of the plurality of save units has been decided by the decision unit as the at least one save unit which does not need the authorization processing, authorization necessity information indicating whether execution of the authorization processing is necessary, to each of authorization request units corresponding to each of the plurality of save units.

3. The information processing device according to claim 2,
   wherein the transmission unit transmits authorization necessity information indicating that execution of the authorization processing is not necessary, to each of authorization request units corresponding to each of the at least one save unit which does not need the authorization processing decided by the decision unit, and transmits authorization necessity information indicating that execution of the authorization processing is necessary, to each of authorization request unit corresponding to each save unit included in the plurality of save units other than the at least one save unit which does not need the authorization processing.

4. The information processing device according to claim 1, wherein the first acquisition unit acquires a value being equal to or less than a difference obtained by subtracting the restoration number from the division number, as the omission number.

5. The information processing device according to claim 4,
   wherein the first acquisition unit acquires a value smaller than the restoration number, as the omission number.

6. The information processing device according to claim 1, wherein the processor is further configured to execute:
   a second acquisition unit that acquires a communication time regarding authorization request units corresponding to each of the plurality of save units,
   wherein the decision unit decides the at least one save unit which does not need the authorization processing from among the plurality of save units, based on the communication time acquired by the second acquisition unit and the authorization omission information acquired by the first acquisition unit.

7. The information processing device according to claim 6,
   wherein the second acquisition unit acquires, as the communication time, a time required for communication when each of the authorization request units corresponding to each of the plurality of save units performs the authorization processing, and
   wherein the decision unit decides the authorization request units of the omission number acquired by the first acquisition unit in order from the authorization request unit requiring a longest communication time acquired by the second acquisition unit among the authorization request units corresponding to the plurality of save units, and decides each save unit corresponding to each of the decided authorization request units, as the at least one save unit which do not need the authorization processing.

8. The information processing device according to claim 7,
   wherein the second acquisition unit acquires, as the communication time, a time required for communication between each of the authorization request units corresponding to each of the plurality of save units and the information processing device.

9. The information processing device according to claim 7,
   wherein the second acquisition unit acquires, as the communication time, a sum of a time required for communication between each of the authorization request units corresponding to each of the plurality of save units and the information processing device and a time required for communication between each of the authorization request units corresponding to each of the plurality of save units and a control device.

10. The information processing device according to claim 6,
    wherein the decision unit specifies, from among all of combinations in which the omission number of authorization request units among the authorization request units each corresponding to each of the plurality of save units are authorization request units corresponding to the at least one save unit which do not need the authorization processing, a combination in which a value at ranking of a value of the restoration number counted from a smallest value among the communication times of the authorization request units is smallest in the combinations, and decides each save unit corresponding to each of authorization request units corresponding to the specified combination as the at least one save unit which do not need the authorization processing.

11. An authorization system comprising a control device, a plurality of authorization request units each corresponding to each of a plurality of save units, and a management server,
    wherein the control device comprises a first processor configured to execute an operation request transmission unit that transmits an operation request regarding each object piece of an object to each of the plurality of authorization request units corresponding to each of the plurality of save units being an operation request destination,
    wherein each of the plurality of authorization request units comprises:
       a determination unit that determines, when receiving the operation request of the object piece of the objet from the control device, whether the authorization request unit performs authorization processing for the operation request of the object piece, based on authorization necessity information indicating whether the authorization request unit needs execution of the authorization processing; and an authorization request transmission unit that transmits, when the determination unit determines that the authorization processing is performed for the operation request of the object piece, an authorization request regarding the operation request of the object piece to the management server, wherein each of the plurality of authorization request units is executed by one or more second processors, and wherein the management server comprises a third processor configured to execute:

an authorization unit that performs the authorization processing responding to the authorization request transmitted from the authorization request transmission unit; and an acquisition unit that acquires authorization omission information being information indicating how many save units among the plurality of save units in which the object pieces of the object divided into a division number are stored respectively do not need the authorization processing, based on the division number indicating how many object pieces the object is to be divided into and a restoration number being a number of object pieces required to restore the object, and wherein the authorization omission information comprises an omission number indicating a number of save units which do not need the authorization processing, based on the division number and the restoration number.

12. The authorization system according to claim 11, wherein the third processor of the management server is further configured to execute:

a decision unit that decides at least one save unit which does not need the authorization processing from among the plurality of save units, based on the authorization omission information acquired by the acquisition unit; and a necessity information transmission unit that transmits, based on the at least one save unit which does not need the authorization processing decided by the decision unit, authorization necessity information indicating whether execution of the authorization processing is necessary, to the plurality of authorization request units, and wherein the determination unit determines, when receiving the operation request of the object piece of the objet from the control device, whether to perform authorization processing for the operation request of the object piece, based on the authorization necessity information transmitted from the necessity information transmission unit.

13. An information processing method comprising:

Information processing device, executing:

an acquisition step of acquiring authorization omission information being information indicating how many save units among a plurality of save units in which object pieces of an object divided into a division number are stored respectively do not need authorization processing, based on the division number indicating how many object pieces the object is to be divided into and a restoration number being a number of object pieces required to restore the object wherein the authorization omission information comprises an omission number indicating a number of save units which do not need the authorization processing, based on the division number and the restoration number; and a decision step of deciding at least one save unit which does not need the authorization processing from among the plurality of save units, based on the authorization omission information acquired at the acquisition step.

14. A non-transitory computer-readable recording medium recording a program for causing a computer to execute:

an acquisition step of acquiring authorization omission information being information indicating how many save units among a plurality of save units in which object pieces of an object divided into a division number are stored respectively do not need authorization processing, based on the division number indicating how many object pieces the object is to be divided into and a restoration number being a number of object pieces required to restore the object, wherein the authorization omission information comprises an omission number indicating a number of save units which do not need the authorization processing, based on the division number and the restoration number; and a decision step of deciding at least one save unit which does not need the authorization processing from among the plurality of save units, based on the authorization omission information acquired at the acquisition step.

* * * * *